(12) United States Patent
Yamamoto et al.

(10) Patent No.: US 8,752,878 B2
(45) Date of Patent: Jun. 17, 2014

(54) UTILITY VEHICLE

(75) Inventors: Teruaki Yamamoto, Kakogawa (JP);
Itsuo Takegami, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 160 days.

(21) Appl. No.: 13/340,852

(22) Filed: Dec. 30, 2011

(65) Prior Publication Data
US 2013/0168988 A1 Jul. 4, 2013

(51) Int. Cl.
*B62D 25/00* (2006.01)

(52) U.S. Cl.
USPC ............ 296/26.08; 296/146.1; 296/26.11; 296/183.1; 296/186.4; 296/24.43

(58) Field of Classification Search
USPC .......... 296/146.1, 26.01, 26.08, 26.11, 183.1, 296/183.2, 186.4, 24.43
See application file for complete search history.

(56) References Cited

U.S. PATENT DOCUMENTS

| | | | |
|---|---|---|---|
| 6,905,159 B1 | 6/2005 | Saito et al. | |
| 6,994,388 B2 | 2/2006 | Saito et al. | |
| 7,249,798 B2 | 7/2007 | Saito et al. | |
| 7,578,544 B1 * | 8/2009 | Shimamura et al. | 296/183.2 |
| 8,316,977 B2 * | 11/2012 | Tsumiyama et al. | 180/89.17 |
| 2009/0183938 A1 * | 7/2009 | Cover et al. | 180/291 |

* cited by examiner

*Primary Examiner* — Joseph Pape
(74) *Attorney, Agent, or Firm* — Wenderoth, Lind & Ponack, L.L.P.

(57) ABSTRACT

A utility vehicle according to the present invention includes a front seat, a rear seat, and a cargo bed in order from the front side, wherein the cargo bed is changeable between an expanded state in which the cargo bed is expanded forward into a rear riding space on the front side of the cargo bed and a non-expanded state in which the cargo bed is not expanded in the rear riding space, a pair of left and right rear doors partitioning the rear riding space and left and right exteriors of a vehicle body in the non-expanded state is provided, and the rear doors serve as expansion side walls partitioning an expanded part of the cargo bed and the left and right exteriors of the vehicle body in the expanded state.

8 Claims, 13 Drawing Sheets

UTILITY VEHICLE

BACKGROUND OF THE INVENTION

1. Field of the Invention

The present invention relates to a utility vehicle in which a cargo bed can be expanded forward so as to utilize an area or a capacity of a cargo bed space and a riding space to a maximum extent according to the need of a user.

2. Description of the Related Art

The present applicant filed applications for inventions relating to a utility vehicle having a cargo bed in which an area or a capacity can be expanded, and those applications have already been registered. Examples include U.S. Pat. Nos. 6,905,159, 6,994,388, and 7,249,798.

In utility vehicles shown in the above documents, a front seat and a rear seat are arranged in a riding space covered by a ROPS, and a cargo bed is arranged behind the rear seat. By changing the rear seat from a use state to a stowed state, a front part of the cargo bed can be expanded into the riding space which is occupied by the rear seat in the use state.

FIG. 12 is a left side view of a utility vehicle in which a rear seat is in a use state, the utility vehicle being shown in the conventional art documents. A bench shape front seat 81 has a seat leg 811 upright provided on a floor surface 821 of a cabin 82, a seat plate 812 provided on an upper end surface of the seat leg 811, and a backrest 813 fixed to the seat plate 812 via a support stay and the like. The bench shape front seat 81 generally extends in the left and right direction up to the vicinities of both left and right ends of the cabin 82. Thereby, a plurality of people can be seated side by side. A driver can be seated in a seating area on one end (such as a left end), and passengers can be seated in other seating areas. A bench shape rear seat 83 has a seat plate 831 arranged on the upper side of a box 84 accommodating an engine (not shown), and a backrest 832. The seat plate 831 and the backrest 832 extend in the left and right direction up to the vicinities of both the left and right ends of the cabin 82 as well as the front seat 81. Thereby, a plurality of passengers can be seated side by side.

A folding structure of the rear seat 83 will be described. The seat plate 831 is fixed to an upper surface of a support base 833. A front end of the support base 833 is pivotably supported on a front upper end of the box 84 via a hinge 834. A pair of left and right stays 835 extending downward is secured to the backrest 832, and lower ends of the stays 835 are pivotably coupled to a rear end of the seat plate 831 via a hinge 836.

FIG. 13 is a left side view of the utility vehicle in which the rear seat is in a stowed state, the utility vehicle being shown in the conventional art documents. The backrest 832 is pivoted forward on the hinge 836 so as to be brought into contact with an upper surface of the seat plate 831. Next, by pivoting the seat plate 831 forward on the hinge 834 into a substantially vertical state together with the backrest 832, the rear seat 83 is folded into a stowed state on the rear side of the front seat 81. In such a way, by folding and stowing the rear seat 83, a rear riding space P1 can be utilized as a front expansion space of a cargo bed 85.

The cargo bed 85 is provided with a fixed bottom plate 851, a pair of fixed side walls 852 provided at a substantially right angle to the fixed bottom plate 851 along both left and right edges of the fixed bottom plate 851, an openable and closable gate type rear wall 853 provided in a rear end of the fixed bottom plate 851, and a front wall 854 whose position is adjustable in the front and rear direction as a basic structure. In addition to these members, as shown in FIG. 13, a pair of left and right expansion side walls 855 is provided in order to expand the cargo bed 85 forward.

Therefore, in the above conventional utility vehicle, in order to change the rear seat 83 from a use state to a stowed state and expand the cargo bed 85, the expansion side walls 855 of the cargo bed 85 are separately required.

SUMMARY OF THE INVENTION

The present invention is achieved in consideration with the above problem, and an object thereof is to eliminate need for expansion side walls of a cargo bed.

In order to achieve the above object, the present invention is a utility vehicle, including a front seat, a rear seat, and a cargo bed in order from the front side, wherein the cargo bed is changeable between an expanded state in which the cargo bed is expanded forward into a rear riding space on the front side of the cargo bed and a non-expanded state in which the cargo bed is not expanded in the rear riding space, a pair of left and right rear doors partitioning the rear riding space and left and right exteriors of a vehicle body in the non-expanded state is provided, and the rear doors serve as expansion side walls partitioning an expanded part of the cargo bed and the left and right exteriors of the vehicle body in the expanded state.

According to the above configuration, the rear doors form the side walls of the expanded part of the cargo bed. Thus, there is no need for separately providing expansion side walls, so that a configuration of the cargo bed can be simplified.

In the present invention, preferably, front ends of the rear doors are supported on a vehicle body frame, and the rear doors are openable toward the left and right exteriors of the vehicle body taking the front ends as pivot axes.

According to the above configuration, the rear doors are openable toward the left and right exteriors of the vehicle body. Thus, at the time of opening and closing the rear doors, the rear riding space can be effectively utilized.

In the present invention, preferably, grip portions are formed on left and right outer surfaces of the rear doors, and height of upper ends of the rear doors is the substantially same as height of side walls of the cargo bed.

According to the above configuration, the grip portions are formed on the left and right outer surfaces of the rear doors. Thus, the rear doors can be opened from the exteriors of the vehicle body. The height of the expansion side walls (rear doors) of the expanded part of the cargo bed is the substantially same as the height of the side walls of a reference part. Thus, in the expanded state, a cargo having the same height as a cargo accommodated in the reference part can be accommodated in the expanded part.

In the present invention, preferably, the cargo bed is provided with a reference part in the non-expanded state and the expanded part in the expanded state, the reference part and the expanded part are divided, and the reference part is capable of being brought into a dumping state in which the reference part is inclined downward rearward in the expanded state and the non-expanded state.

According to the above configuration, in both the expanded state and the non-expanded state, only the reference part can be brought into the dumping state separately from the expanded part.

In the present invention, preferably, the rear seat is pivoted forward taking a front end thereof as a center into a substantially upright state in the expanded state, and a bottom plate positioned on the lower side of the rear seat in the non-expanded state is pivotable forward taking the front end as a center in the expanded state.

According to the above configuration, in the expanded state, the bottom plate is pivotable forward. Thus, maintenance of a constituent member positioned on the lower side of the bottom plate such as an engine can be easily performed by bringing the cargo bed into the expanded state.

DETAILED DESCRIPTION OF THE INVENTION

Figure 1:
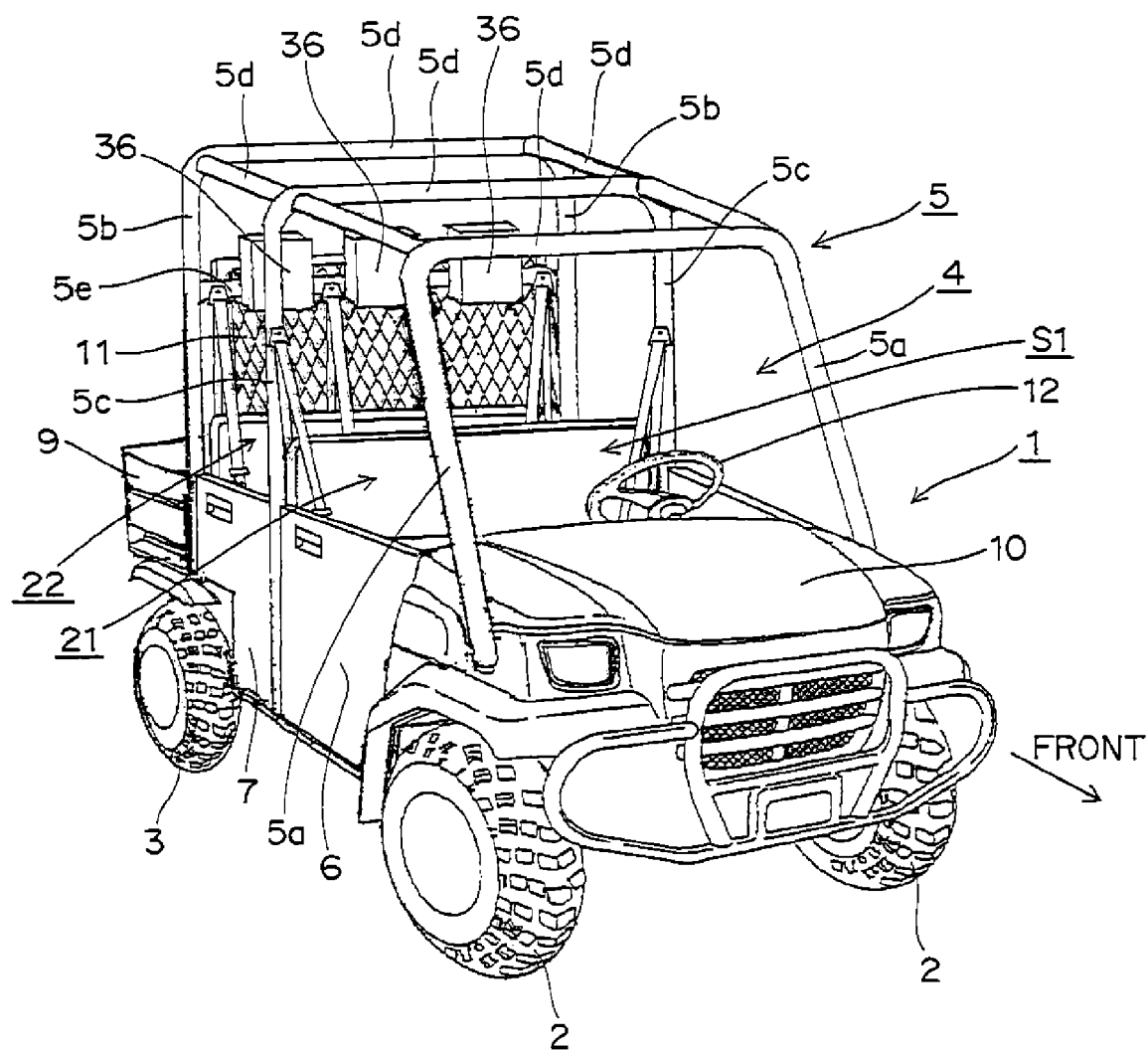
FIG. 1 is a perspective view of a utility vehicle according to the present invention.

FIG. 1 is a perspective view of a utility vehicle according to the present invention. It should be noted that in the following description, a concept of the direction used in the present embodiment matches with a concept of the direction seen from a driver of the utility vehicle.

[Entire Structure of Vehicle]

As shown in FIG. 1, a utility vehicle 1 is provided with a pair of left and right front wheels 2 in a front part of a vehicle body, a pair of left and right rear wheels 3 in a rear part of the vehicle body, and a riding space (cabin) 4 between the front wheels 2 and the rear wheels 3. The riding space 4 is surrounded by a ROPS 5, a pair of left and right front doors 6, and a pair of left and right rear doors 7. An expandable cargo bed 9 is provided behind the riding space 4, and a bonnet 10 is provided in front of the riding space 4. Further, a screen 11 partitioning from the riding space 4 is provided in a front end of the cargo bed 9.

Figure 2:
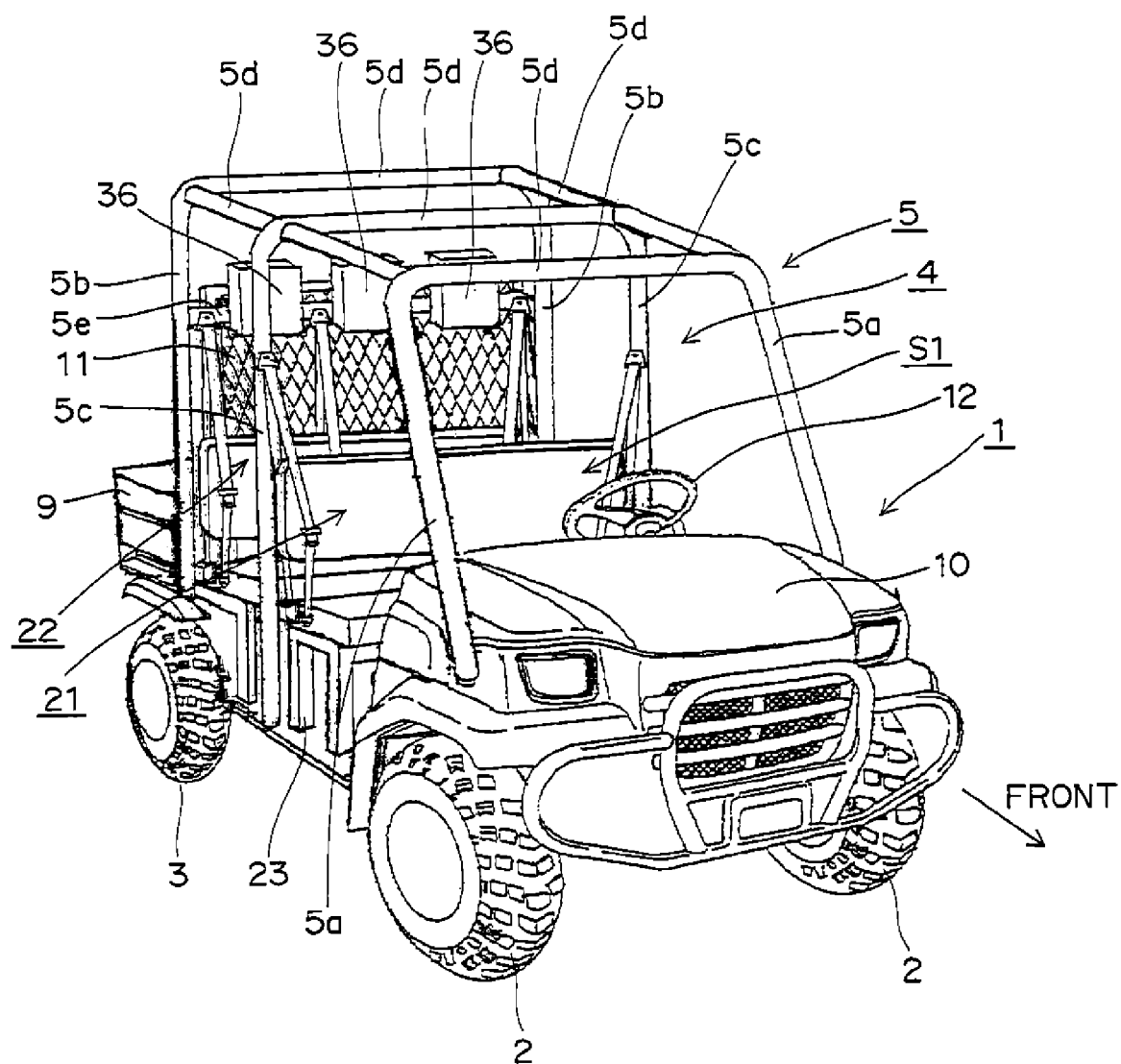
FIG. 2 is a perspective view showing a state that front and rear doors are removed in FIG. 1.

FIG. 2 is a perspective view showing a state that the front and rear doors 6, 7 are removed in FIG. 1. A bench type front seat 21 is installed in a front half part of the riding space 4, and a bench type stowable rear seat 22 is installed in a rear half part of the riding space 4. A left seating area S1 of the front seat 21 is a driver seat, and an operation portion such as a steering wheel 12 is provided in front of the left seating area S1.

[Configuration of ROPS]

The ROPS 5 is an abbreviation of a rollover protective structure serving as part of a vehicle body frame. The ROPS is provided with a pair of left and right front vertical members 5a, a pair of left and right rear vertical members 5b, a pair of left and right intermediate vertical members 5c arranged between the front vertical members 5a and the rear vertical members 5b, and a plurality of upper end beam members 5d for coupling upper ends of the vertical members 5a, 5b, 5c. Further, a cross member 5e extending in the vehicle width direction is integrally formed in the pair of left and right rear vertical members 5b. The cross member 5e is arranged at a position lower than the upper end beam members 5d. Specifically, the cross member 5e is arranged at height corresponding to a shoulder or a neck of a rider seated on the rear seat 22, and three headrests 36 for the rear seat are provided in the cross member 5e.

[Configuration of Cargo Bed]

Figure 3:
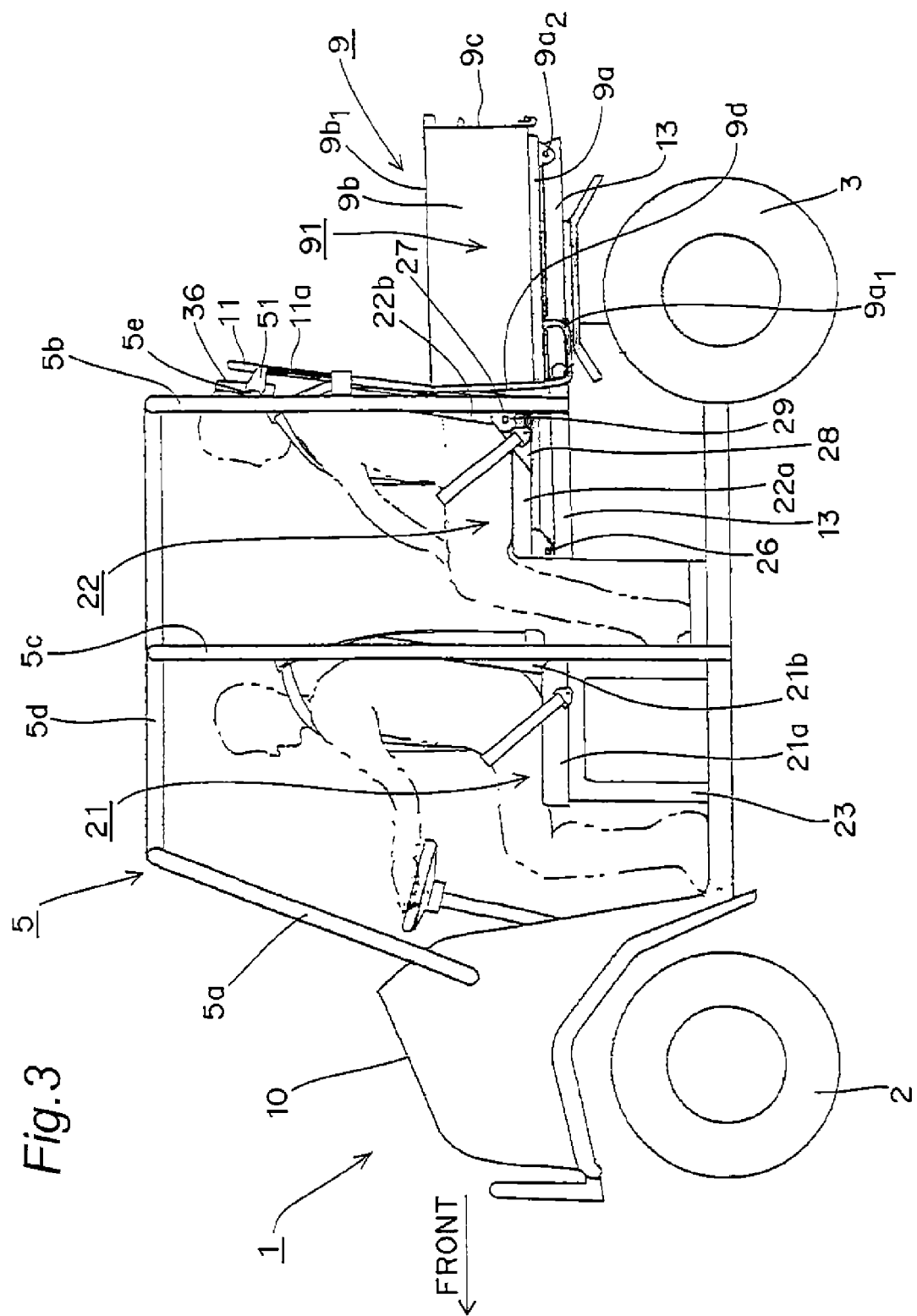
FIG. 3 is a left side view of the utility vehicle in a non-expanded state of a cargo bed.
Figure 4:
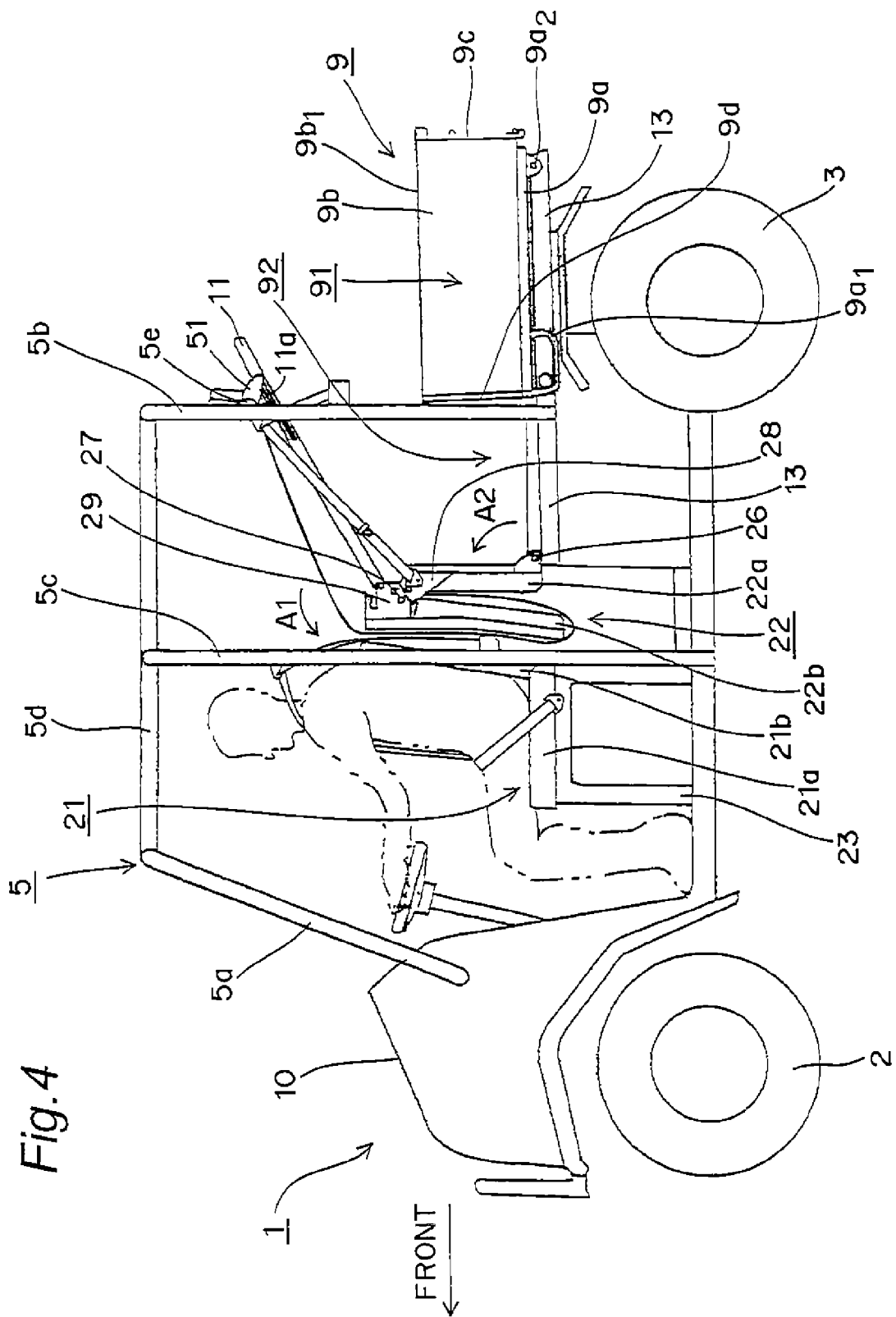
FIG. 4 is a left side view of the utility vehicle in an expanded state of the cargo bed.

FIG. 3 is a left side view of the utility vehicle 1 in a non-expanded state of the cargo bed 9, and FIG. 4 is a left side view of the utility vehicle 1 in an expanded state of the cargo bed 9. FIGS. 3 and 4 show a state that the front and rear doors 6, 7 are removed. As shown in FIG. 3, at the time of the non-expanded state of the cargo bed 9, the stowable rear seat 22 is in a use state (a state that the rider can be seated). As shown in FIG. 4, at the time of the expanded state of the cargo bed 9, the rear seat 22 is folded and stowed immediately behind the front seat 21.

As shown in FIGS. 3 and 4, the cargo bed 9 is provided with a reference part 91 in the non-expanded state and an expanded part 92 in the expanded state. The reference part 91 and the expanded part 92 are divided, and the reference part 91 is provided with a bottom wall 9a, left and right side walls 9b, a rear wall 9c, and a front wall 9d. The bottom wall 9a is supported on a rear end of a bottom frame 13 of the vehicle body pivotably taking a shaft 9a2 as a center.

Figure 5:
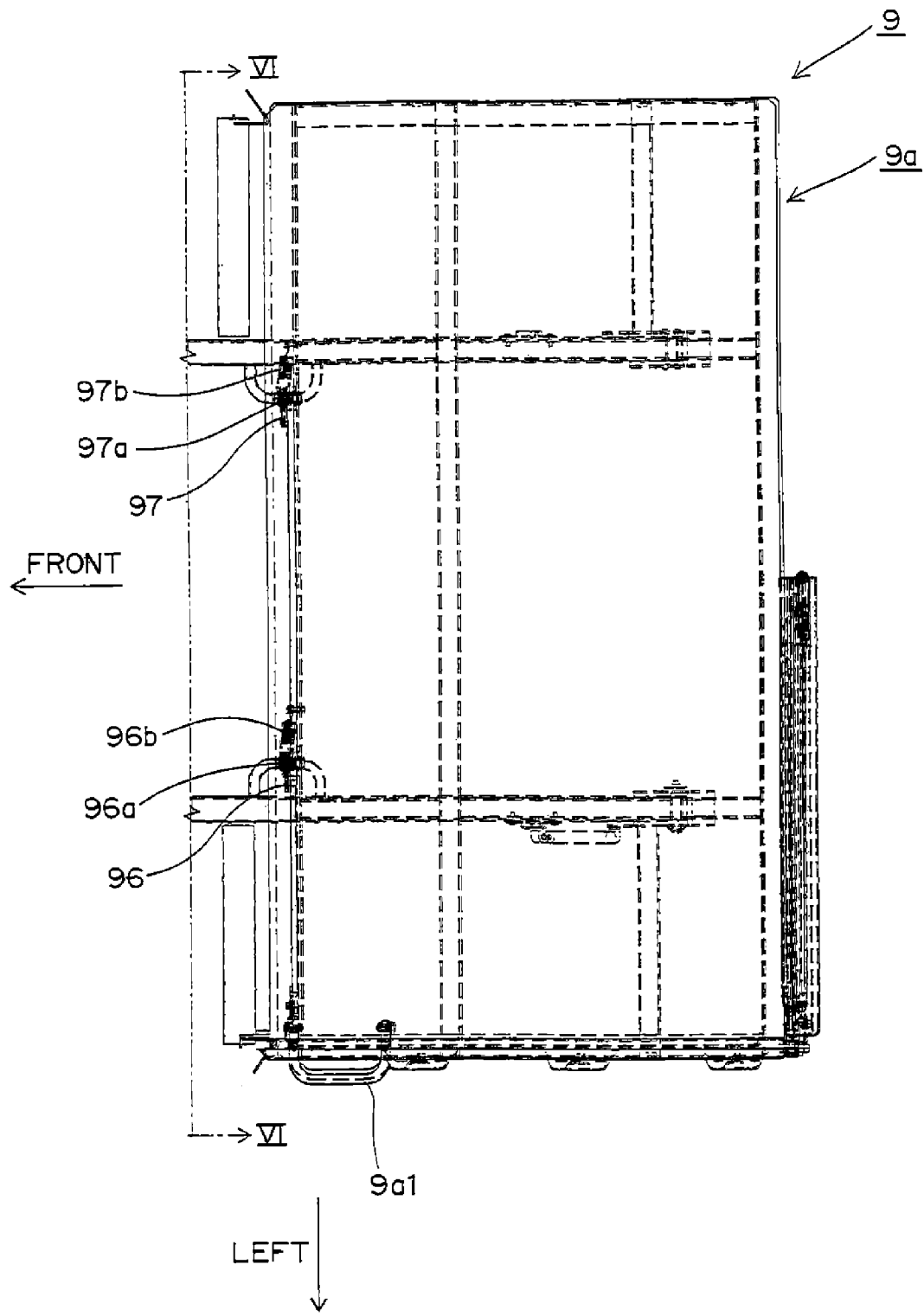
FIG. 5 is an upper surface perspective view showing a fixed structure of a bottom wall of the cargo bed.
Figure 6:
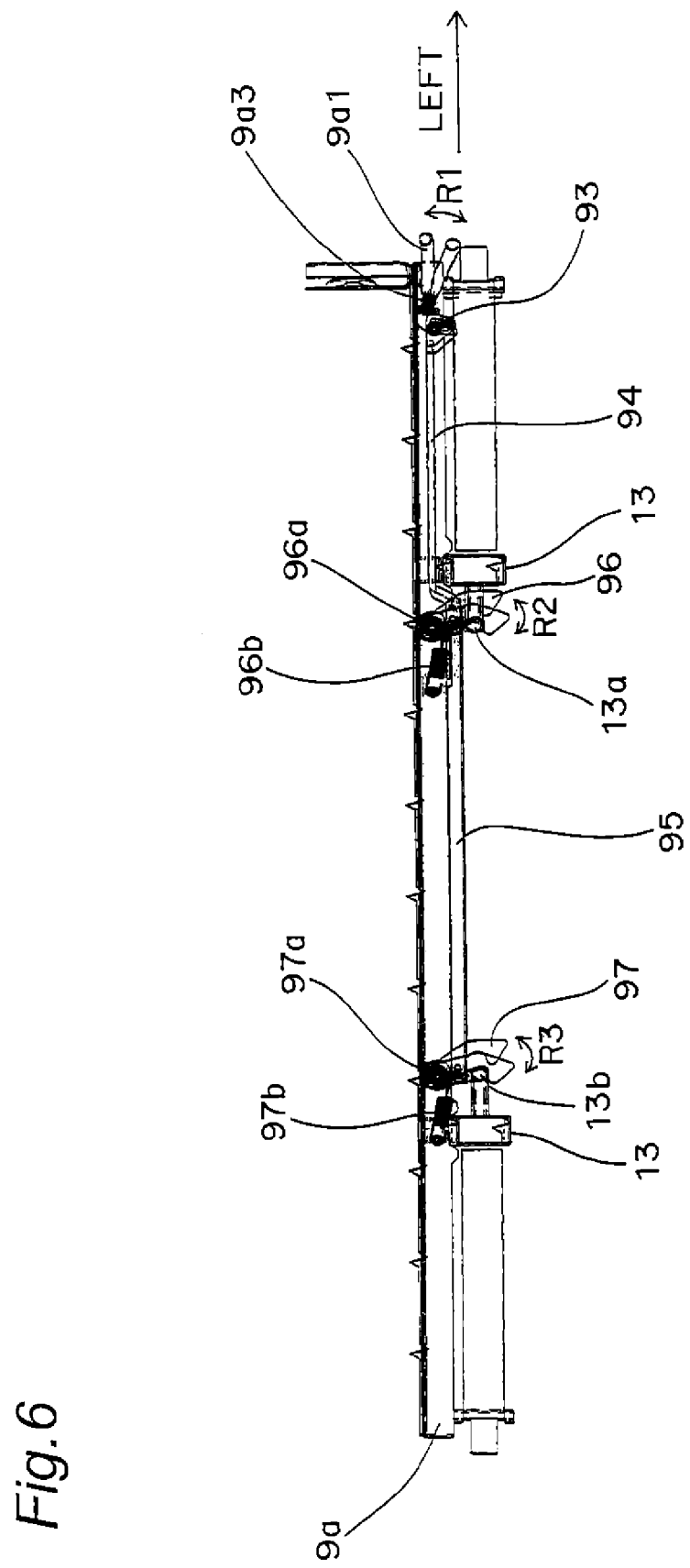
FIG. 6 is a sectional view by an arrow VI-VI of FIG. 5.

FIG. 5 is an upper surface perspective view showing a fixed structure of the bottom wall 9a of the cargo bed 9, and FIG. 6 is a sectional view by an arrow VI-VI of FIG. 5. As shown in FIGS. 5 and 6, a ring 9a1 is attached on the left side of a front part of the bottom wall 9a. The ring 9a1 is formed pivotably in the up and down direction (pivot direction R1) taking a shaft 9a3 as a pivot center. The shaft 9a3 is connected to an arm 94 via a link mechanism 93. As a result, when the ring 9a1 is pivoted in the R1 direction taking the shaft 9a3 as a center, the arm 94 is moved in the left and right direction. Further, an arm 95 and a hook 96 are connected to an end of the arm 94, and a hook 97 is connected to an end of the arm 95. The hook 96 is pivotable in the left and right direction (pivot direction R2) taking a shaft 96a attached to the bottom wall 9a as a pivot center, and further biased rightward by an elastic member 96b attached to the bottom wall 9a. The hook 96 is engaged with an engagement member 13a provided in the bottom frame 13 by the elastic member 96b. Similarly, the hook 97 is pivotable in the left and right direction (pivot direction R3) taking a shaft 97a attached to the bottom wall 9a as a pivot center, and further biased rightward by an elastic member 97b attached to the bottom wall 9a. The hook 97 is engaged with an engagement member 13b provided in the bottom frame 13 by the elastic member 97b.

As described above, since the hook 96 and the engagement member 13a are engaged and the hook 97 and the engagement member 13b are engaged, the bottom wall 9a of the cargo bed 9 is fixed to the bottom frame 13.

[Configuration of Front Seat]

In FIG. 3, the bench type front seat 21 is provided with one rectangular seat bottom 21a elongated in the lateral direction and one rectangular backrest 21b elongated in the lateral direction. The seat bottom 21a and the backrest 21b are fixed to support legs 23.

[Configuration of Rear Seat]

In FIG. 3, the bench type stowable rear seat 22 is provided with one rectangular seat bottom 22a elongated in the lateral direction, one rectangular backrest 22b and the three headrests 36. As described above, the rear seat 22 is formed in such a manner that a position thereof is changeable between the use state that the rider can be seated while facing forward (FIG. 3) and a stowed state that the rear seat is stowed on the back of the backrest 21b of the front seat 21 (FIG. 4). A specific folding structure will be described. A front end of the seat bottom 22a of the rear seat 22 is pivotably supported by the bottom frame 13 via a front hinge 26, and a lower end of the backrest 22b is pivotably coupled to a rear end of the seat bottom 22a via a rear hinge 27. The rear hinge 27 provides pivotable coupling between a metal seat bottom side bracket 28 secured to the rear end of the seat bottom 22a and a metal backrest side bracket 29 secured to the lower end of the backrest 22b.

As shown in FIG. 4, in a state that the rear seat 22 is stowed, the backrest 22b is pivoted anticlockwise (in the arrow A1 direction) on the rear hinge 27 and abutted with a surface of the seat bottom 22a, and the seat bottom 22a is pivoted anticlockwise (in the arrow A2 direction) on the front hinge 26 and brought into a substantially vertical state at a rear position of the backrest 21b of the front seat 21. That is, since the backrest 22b is folded on the rear hinge 27 so as to be substantially parallel to the seat bottom 22a and further, the backrest 22b in a folded state and the seat bottom 22a are pivoted front-upward on the front hinge 26, the rear seat 22 is changed into the standing stowed state as in FIG. 4.

[Configuration of Screen]

FIG. 3 shows a state that the screen 11 is placed at a first position, and FIG. 4 shows a state that the screen 11 is placed at a second position. Guide grooves 11a extending along the screen longitudinal direction are formed in left and right side parts of the screen 11. Guide pins (not shown) are provided in the cross member 5e of the ROPS 5 via support brackets 51. The guide grooves 11a are movable in the screen longitudinal direction and pivotable with respect to the guide pins. As a result, by pivoting the screen 11 on the guide pins and linearly moving the screen 11 in such a manner that the guide pins are moved along the guide grooves 11a, a position of the screen 11 is changeable between the first position for partitioning the cargo bed 9 in the non-expanded state and the rear seat 22 in the use state as shown in FIG. 3 and the second position for covering a front part of the cargo bed 9 in the expanded state in an inclination posture as shown in FIG. 4.

[Configuration of Front Door]

Figure 7:
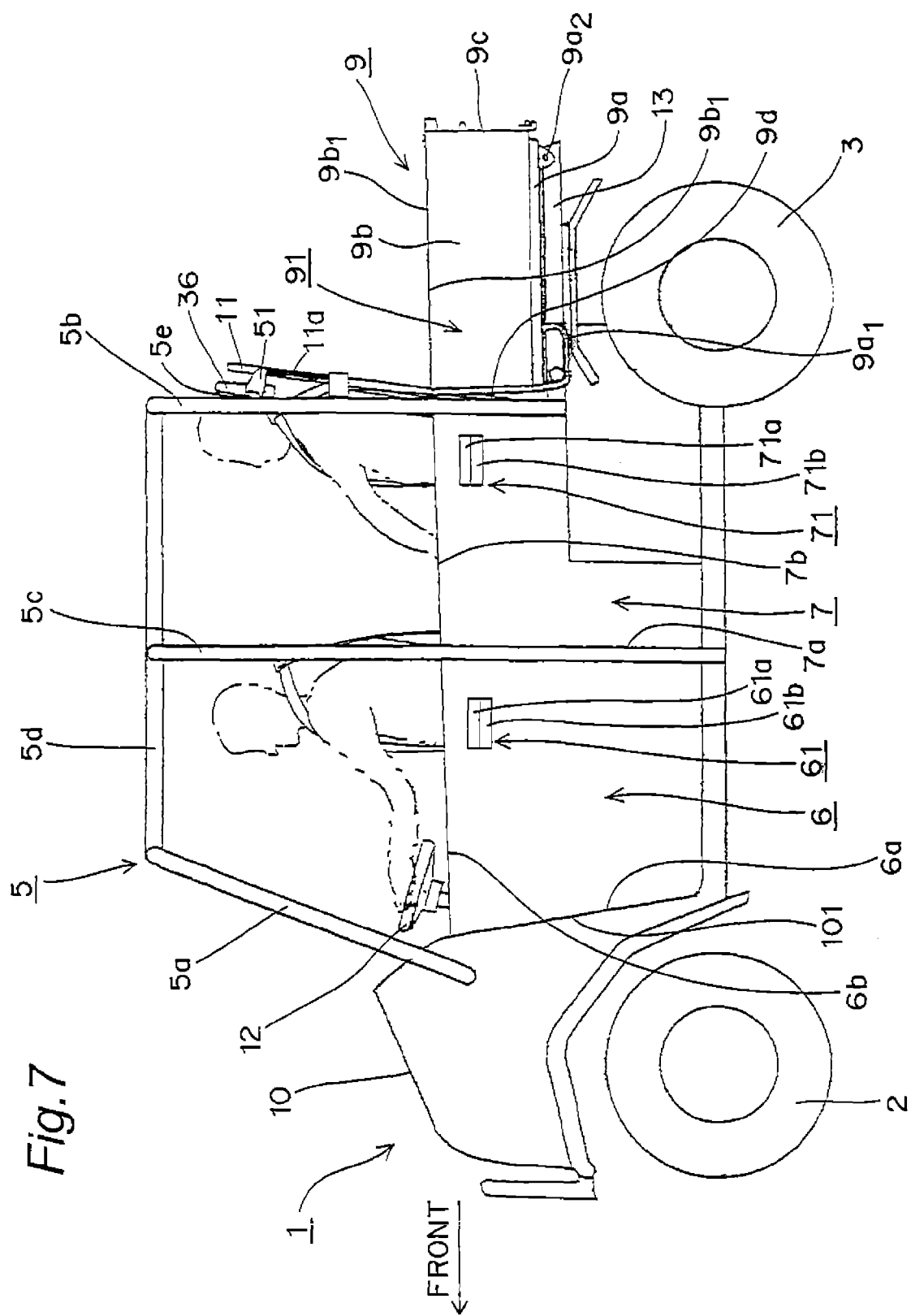
FIG. 7 is a left side view showing a state that the front and rear doors are attached in FIG. 3.
Figure 8:
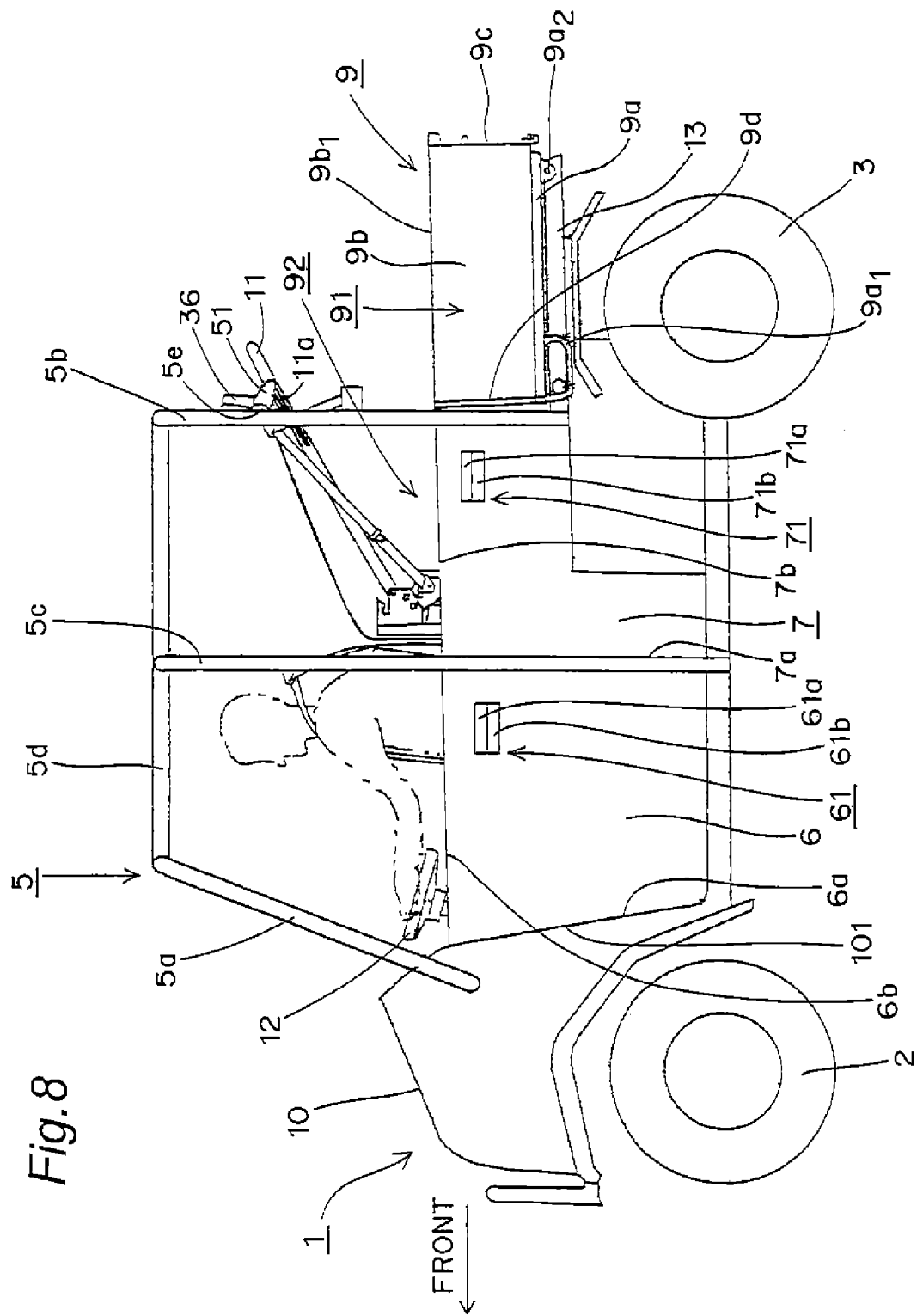
FIG. 8 is a left side view showing a state that the front and rear doors are attached in FIG. 4.

FIG. 7 is a left side view showing a state that the front and rear doors 6, 7 are attached in FIG. 3, and FIG. 8 is a left side view showing a state that the front and rear doors 6, 7 are attached in FIG. 4. Front ends 6a of the front doors 6 are supported on a front frame 101 supporting the bonnet 10, and the front doors are openable toward left and right exteriors of the vehicle body taking the front ends 6a as pivot axes. Specifically, hinges are formed in the front ends 6a of the front doors 6, and by attaching the hinges to the front frame 101, the front doors 6 are openable toward the exteriors of the vehicle body.

Grip portions 61 are formed on outer surfaces of rear upper parts of the front doors 6. Each of the grip portions 61 has a grip part 61a gripped by a hand of the rider, and a recess part 61b into which part of the hand gripping the grip part 61a can be inserted. In the present embodiment, the grip part 61a is formed in an upper part and the recess part 61b is formed in a lower part. The rider grips the grip portion 61 so as to open and close the front door 6. It should be noted that the grip portions 61 have a lock function of locking the front doors 6 into a closed state.

[Configuration of Rear Door]

Front ends 7a of the rear doors 7 are supported on the intermediate vertical members 5c of the ROPS 5, and the rear doors are openable toward the left and right exteriors of the vehicle body taking the front ends 7a as pivot axes. Specifically, hinges are formed in the front ends 7a of the rear doors 7, and by attaching the hinges to the intermediate vertical members 5c, the rear doors 7 are openable toward the exteriors of the vehicle body.

Grip portions 71 are formed on outer surfaces of rear upper parts of the rear doors 7. Each of the grip portions 71 has a grip part 71a gripped by the hand of the rider, and a recess part 71b into which part of the hand gripping the grip part 71a can be inserted. In the present embodiment, the grip part 71a is formed in an upper part and the recess part 71b is formed in a lower part. The rider grips the grip portion 71 so as to open and close the rear door 7. It should be noted that the grip portions 71 have a lock function of locking the rear doors 7 into a closed state.

As shown in FIG. 7, in the non-expanded state of the cargo bed 9, the rear doors 7 function as doors for the rider seated on the rear seat 22 to get on and off the vehicle. Meanwhile, as shown in FIG. 8, in the expanded state of the cargo bed 9, the rear doors 7 function as side walls of the expanded part 92 of the cargo bed 9.

As shown in FIGS. 7 and 8, upper ends 6b of the front doors 6, upper ends 7b of the rear doors 7, and upper ends 9b1 of the side walls 9b of the cargo bed 9 have substantially matched height in the up and down direction.

[Configuration Relating to Dumping of Cargo Bed]

Figure 9:
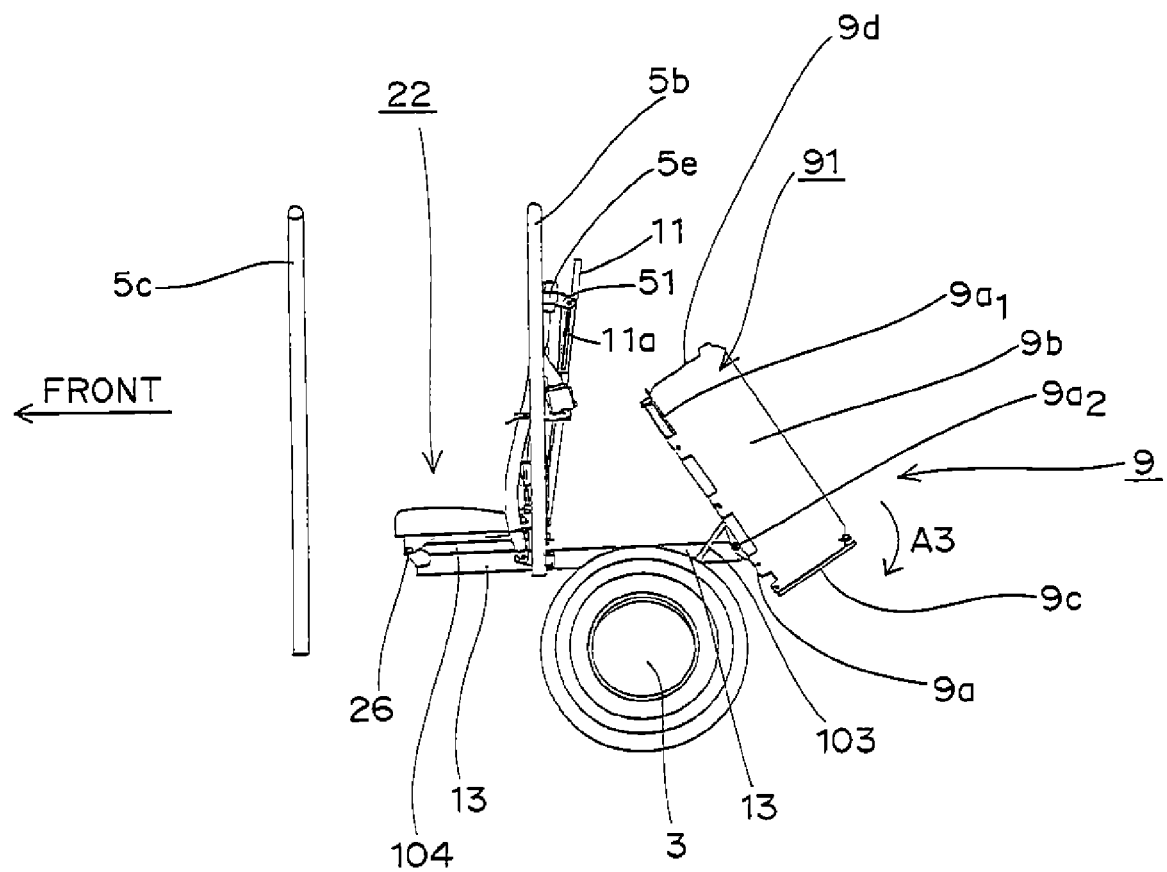
FIG. 9 is a left side view of a rear part of the utility vehicle showing a state that a reference part of the cargo bed is brought into a dumping state in the non-expanded state of the cargo bed.
Figure 10:
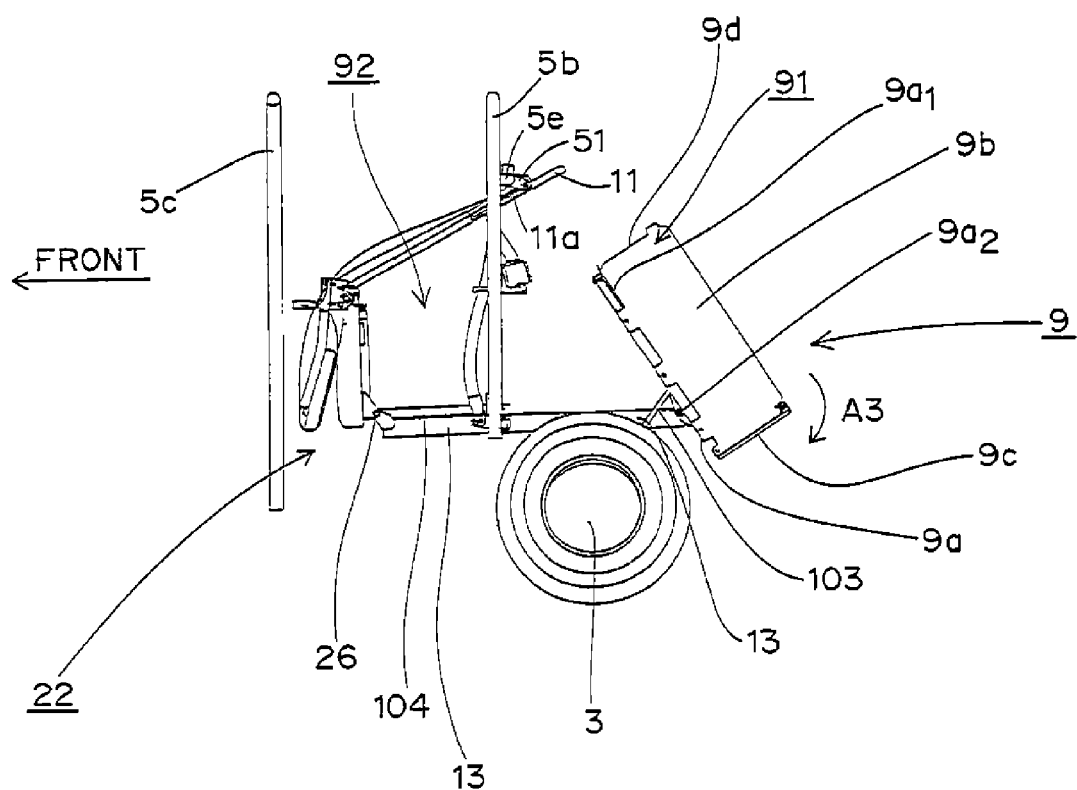
FIG. 10 is a left side view of the rear part of the utility vehicle showing a state that the reference part of the cargo bed is brought into the dumping state in the expanded state of the cargo bed.

FIG. 9 is a left side view of a rear part of the utility vehicle 1 showing a state that the reference part 91 of the cargo bed 9 is brought into a dumping state in the non-expanded state of the cargo bed 9, and FIG. 10 is a left side view of the rear part of the utility vehicle 1 showing a state that the reference part 91 of the cargo bed 9 is brought into the dumping state in the expanded state of the cargo bed 9.

As described above, in the cargo bed 9, in general, by engaging the hook 96 and the engagement member 13a and engaging the hook 97 and the engagement member 13b, the bottom wall 9a of the cargo bed 9 is fixed to the bottom frame 13 as shown in FIGS. 5 and 6. In order to bring the reference part 91 of the cargo bed 9 into the dumping state, firstly, the ring 9a1 is pivoted upward in the R1 direction taking the shaft 9a3 as a center. As a result, the link mechanism 93 moves the arm 94 leftward, and further moves the arm 95 connected to the arm 94 leftward. By moving the arm 94 leftward, the hook 96 is pivoted leftward in the R2 direction taking the shaft 96a as a center against biasing of the elastic member 96b, so that the hook 96 and the engagement member 13a are disengaged. By moving the arm 95 leftward, the hook 97 is pivoted leftward in the R3 direction taking the shaft 97a as a center against biasing of the elastic member 97b, so that the hook 97 and the engagement member 13b are disengaged. As a result, the bottom wall 9a of the cargo bed 9 is pivotable on the shaft 9a2.

As shown in FIGS. 9 and 10, when the bottom wall 9a is pivoted on the shaft 9a2 in the arrow A3 direction, the reference part 91 is brought into the dumping state in which the reference part is inclined downward rearward. Thus, a cargo loaded on the reference part 91 can be unloaded. It should be noted that the bottom wall 9a and the bottom frame 13 are coupled by a dumper mechanism 103. The dumper mechanism 103 can maintain the dumping state, and is provided with a buffering function for the reference part 91 in the dumping state to slowly return at the time of returning to an original position on the bottom frame 13.

As described above, the reference part 91 and the expanded part 92 are divided. Thus, as shown in FIGS. 9 and 10, in any of the non-expanded state and the expanded state of the cargo bed 9, only the reference part 91 can be brought into the dumping state in which the reference part is inclined downward rearward.

Figure 11:
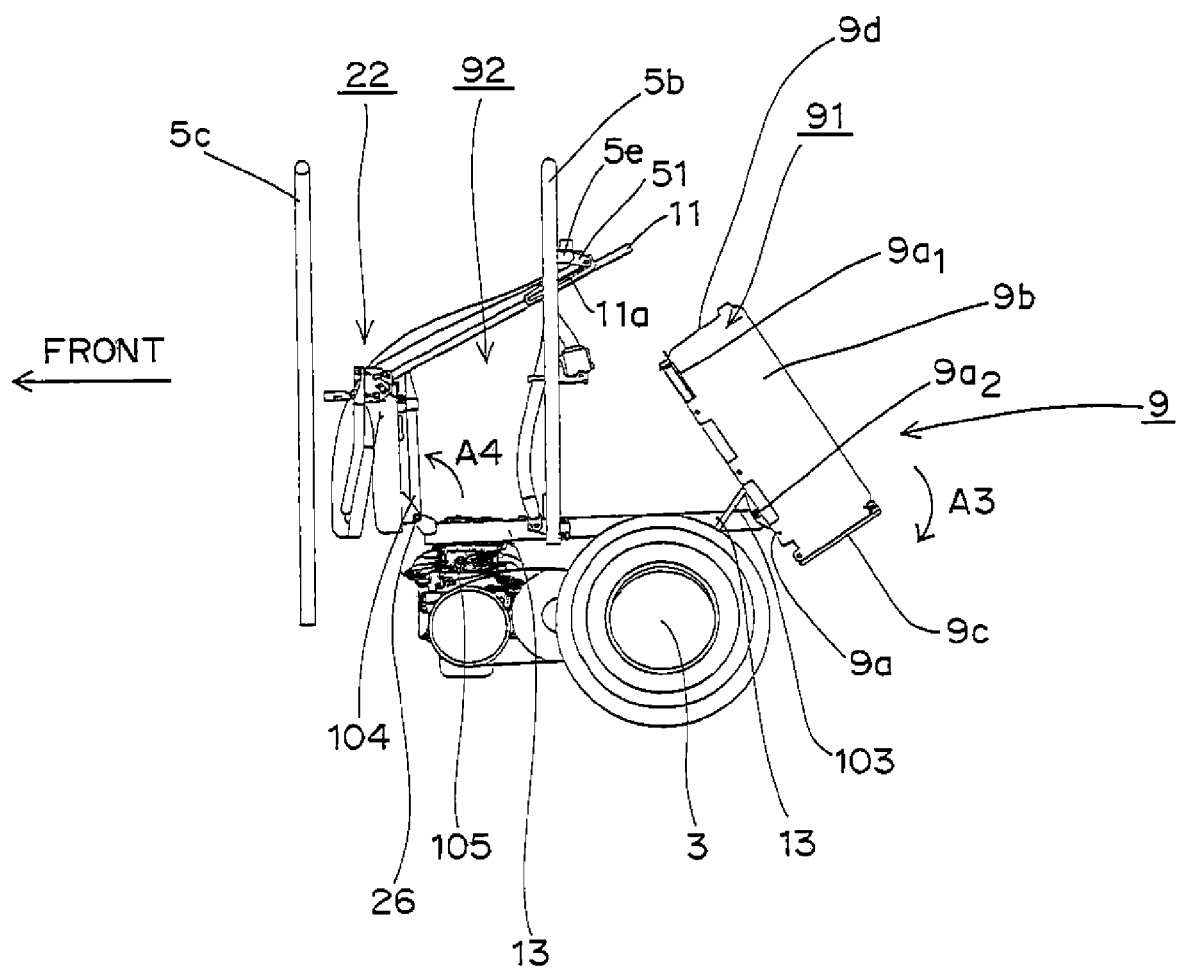
FIG. 11 is a left side view of the rear part of the utility vehicle showing a state that a bottom plate positioned on the lower side of a rear seat in the non-expanded state is pivoted forward in FIG. 10.
Figure 12:
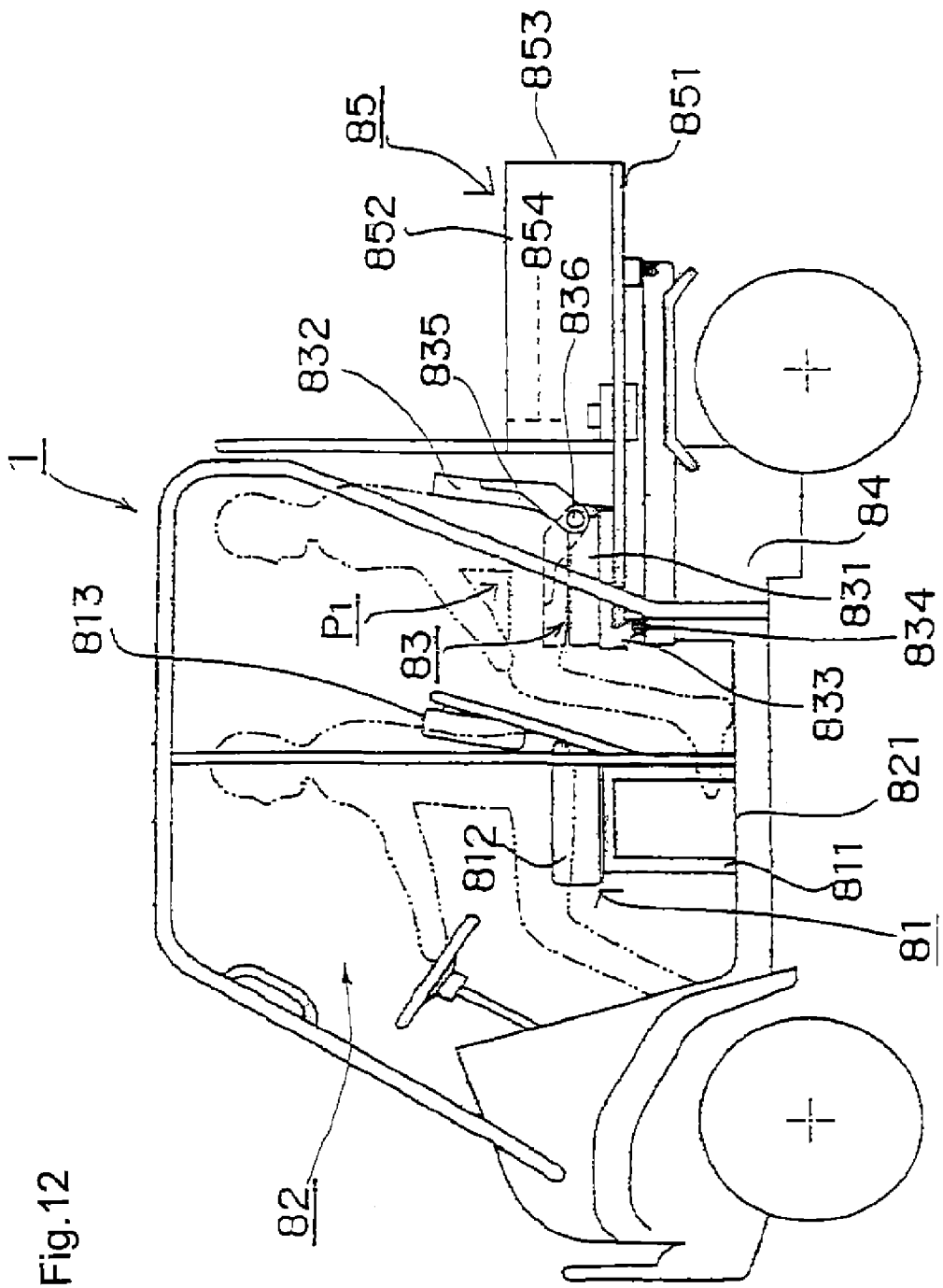
FIG. 12 is a left side view of a conventional utility vehicle having a four-seater specification.
Figure 13:
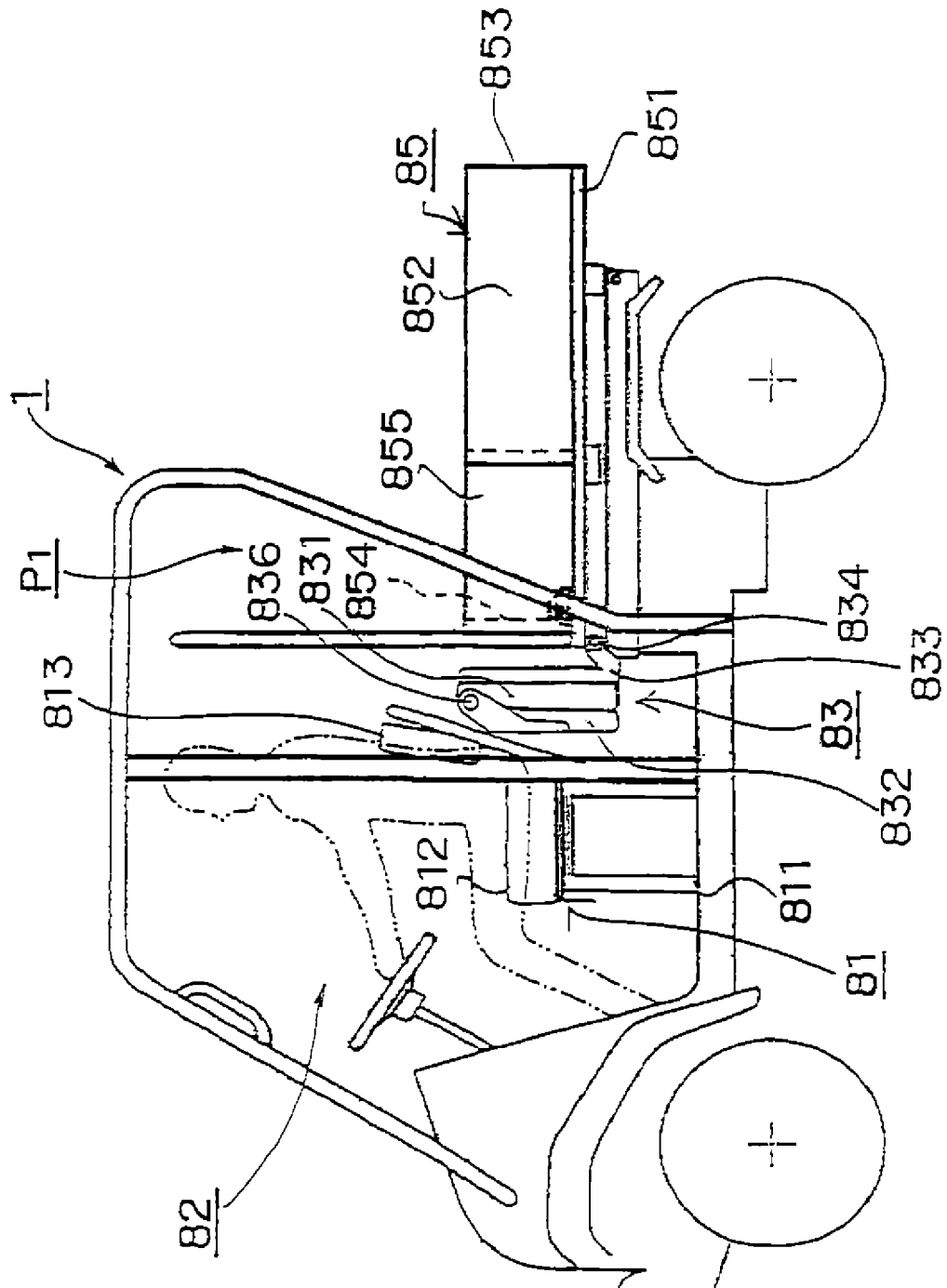
FIG. 13 is a left side view of a conventional utility vehicle having a two-seater specification.

FIG. 11 is a left side view of the rear part of the utility vehicle 1 showing a state that a bottom plate 104 positioned on the lower side of the rear seat 22 in the non-expanded state of the cargo bed 9 is pivoted forward in FIG. 10. As shown in FIG. 11, a front end of the bottom plate 104 is pivotably supported on the bottom frame 13 via the front hinge 26. By being pivoted on the front hinge 26 in the arrow A4 direction, the bottom plate 104 is brought into a substantially vertical state at a rear position of the rear seat 22. As a result, an engine 105 positioned on the lower side of the bottom plate 104 in the non-expanded state of the cargo bed 9 is accessible from the upper side by pivoting the bottom plate 104 forward in the expanded state of the cargo bed 9.

According to the utility vehicle 1 of the above embodiment, the following effects can be obtained.

(1) The rear doors 7 serve as expansion side walls partitioning the expanded part 92 of the cargo bed 9 and the left and right exteriors of the vehicle body in the expanded state of the cargo bed 9. Thus, there is no need for separately providing expansion side walls, so that a configuration of the cargo bed 9 can be simplified.

(2) The front doors 6 are openable toward the left and right exteriors of the vehicle body. Thus, at the time of opening and closing the front doors 6, a front riding space can be effectively utilized.

(3) The rear doors 7 are openable toward the left and right exteriors of the vehicle body. Thus, at the time of opening and closing the rear doors 7, a rear riding space can be effectively utilized.

(4) The grip portions 61 are formed on the left and right outer surfaces of the front doors 6. Thus, the front doors 6 can be easily opened from the exteriors of the vehicle body.

(5) The grip portions 71 are formed on the left and right outer surfaces of the rear doors 7. Thus, the rear doors 7 can be easily opened from the exteriors of the vehicle body. The height of the expansion side walls (rear doors) 7 of the expanded part 92 of the cargo bed 9 is the substantially same as the height of the side walls 9b of the reference part 91. Thus, in the expanded state of the cargo bed 9, a cargo having the same height as a cargo accommodated in the reference part 91 can be accommodated in the expanded part 92.

(6) In the cargo bed 9, the reference part 91 and the expanded part 92 are divided, and in the expanded state and the non-expanded state of the cargo bed 9, the reference part 91 can be brought into the dumping state in which the reference part is inclined downward rearward. Thus, in both the expanded state and the non-expanded state, only the reference part 91 can be brought into the dumping state separately from the expanded part 92. As a result, only a cargo loaded on the reference part 91 can be unloaded separately from a cargo loaded on the expanded part 92.

(7) The rear seat 22 is pivoted forward taking the front hinge 26 as a center into a substantially upright state in the expanded state, and the bottom plate 104 positioned on the lower side of the rear seat 22 in the non-expanded state is pivotable forward taking the front hinge 26 as a center in the expanded state. Therefore, in the expanded state of the cargo bed 9, the engine 105 positioned on the lower side of the bottom plate 104 is accessible from the upper side, so that maintenance of the engine 105 can be performed.

Although the front seat 21 and the rear seat 22 are formed into a bench shape in the above embodiment, the seats may be formed into a box shape.

In the above embodiment, the reference part 91 and the expanded part 92 are divided by the front wall 9d of the reference part 91. However, the front wall 9d may be not provided or detachably formed in the reference part 91, and the reference part 91 and the expanded part 92 may be used as an integral body in the expanded state of the cargo bed 9.

The present invention is not limited to the configuration of the above embodiment but includes various modified examples considered within a range not departing from the content described in the claims.

What is claimed is:

1. A utility vehicle, comprising:
   a front seat;
   a rear seat disposed in a rear riding space;
   a cargo bed disposed on an opposite side of the rear seat from the front seat, the cargo bed being changeable between an expanded state in which the cargo bed is expanded forward into the rear riding space on the front side of the cargo bed and a non-expanded state in which the cargo bed is not expanded in the rear riding space;
   left and right rear doors which partition the rear riding space from an exterior of the utility vehicle in the non-expanded state of the cargo bed; and
   grip portions formed on the outer surfaces of the left and right rear doors, respectively,
   wherein the rear doors serve as expansion side walls partitioning an expanded part of the cargo bed from the exterior of the utility vehicle in the expanded state of the cargo bed,
   wherein the cargo bed includes side walls, and
   wherein a height of upper ends of the rear doors is the substantially the same as a height of the side walls of the cargo bed.

2. The utility vehicle of claim 1, further comprising:
   a vehicle body frame,
   wherein front ends of the rear doors are supported on the vehicle body frame, and the rear doors are openable toward the left and right exteriors of the vehicle body by pivoting about the front ends thereof.

3. The utility vehicle of claim 1, wherein the cargo bed includes a reference part which is divided from the expanded part, and the reference part is capable of being brought into a dumping state in which the reference part is inclined downward in a rear direction in both the expanded state and the non-expanded state.

4. The utility vehicle of claim 1, further comprising a bottom plate positioned on a lower side of the rear seat in the non-expanded state of the cargo bed,
   wherein the rear seat is configured to pivot forward about a front end thereof into a substantially upright state in the expanded state of the cargo bed, and
   wherein the bottom plate is configured to pivot forward about a front end thereof in the expanded state of the cargo bed.

5. A utility vehicle, comprising:
   a front seat
   a rear seat disposed in a rear riding space;
   a cargo bed disposed on an opposite side of the rear seat from the front seat, the cargo bed being changeable between an expanded state in which the cargo bed is expanded forward into the rear riding space on the front side of the cargo bed and a non-expanded state in which the cargo bed is not expanded in the rear riding space; and left and right rear doors which partition the rear riding space from an exterior of the utility vehicle in the non-expanded state of the cargo bed, wherein the rear doors serve as expansion side walls partitioning an expanded part of the cargo bed from the exterior of the utility vehicle in the expanded state of the cargo bed, wherein the cargo bed includes side walls, and wherein a height of upper ends of the rear doors is the substantially the same as a height of the side walls of the cargo bed.

6. The utility vehicle of claim 5, further comprising:

a vehicle body frame, wherein front ends of the rear doors are supported on the vehicle body frame, and the rear doors are openable toward the left and right exteriors of the vehicle body by pivoting about the front ends thereof.

7. The utility vehicle of claim 5, wherein the cargo bed includes a reference part which is divided from the expanded part, and the reference part is capable of being brought into a dumping state in which the reference part is inclined downward in a rear direction in both the expanded state and the non-expanded state.

8. The utility vehicle of claim 5, further comprising a bottom plate positioned on a lower side of the rear seat in the non-expanded state of the cargo bed, wherein the rear seat is configured to pivot forward about a front end thereof into a substantially upright state in the expanded state of the cargo bed, and wherein the bottom plate is configured to pivot forward about a front end thereof in the expanded state of the cargo bed.

* * * * *